(12) United States Patent
Park et al.

(10) Patent No.: US 7,876,922 B2
(45) Date of Patent: Jan. 25, 2011

(54) SPEAKER DEVICE FOR PORTABLE TERMINAL

(75) Inventors: Dong-Ik Park, Suwon-si (KR); Han-Sang Lim, Seoul (KR); Jun-Tai Kim, Yongin-si (KR); Dae-Hyun Sim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1161 days.

(21) Appl. No.: 11/524,711

(22) Filed: Sep. 21, 2006

(65) Prior Publication Data

US 2007/0081691 A1    Apr. 12, 2007

(30) Foreign Application Priority Data

Oct. 6, 2005    (KR) ............... 10-2005-0094012

(51) Int. Cl.
    *H04R 25/00*    (2006.01)
(52) U.S. Cl. ............... 381/388; 381/306; 381/333; 381/337
(58) Field of Classification Search ......... 381/300–301, 381/304–306, 332–336, 337, 348, 351–352, 381/160–162, 388
    See application file for complete search history.

(56) References Cited

U.S. PATENT DOCUMENTS

| | | | | | |
|---|---|---|---|---|---|
| 5,361,380 | A | * | 11/1994 | You et al. | 381/388 |
| 5,418,338 | A | * | 5/1995 | Kim | 181/199 |
| 5,721,401 | A | * | 2/1998 | Sim | 181/155 |
| 6,075,868 | A | * | 6/2000 | Goldfarb et al. | 381/388 |

* cited by examiner

*Primary Examiner*—Suhan Ni
(74) *Attorney, Agent, or Firm*—The Farrell Law Firm, LLP

(57) ABSTRACT

Provided is a speaker device for a portable terminal. The speaker device includes a speaker housing which provides a mounting space for accommodating a speaker unit and a resonating space connected to the mounting space and located around the mounting space. The speaker device solves the disadvantages of a small-size speaker unit, i.e., problems in producing a sound in a bass region, thereby producing a "live" sound. Moreover, the characteristics of a sound can be improved using the speaker housing, without addition of a separate speaker unit or addition or change of software or a circuit, thereby improving the performance of a speaker device of the portable terminal at low cost.

7 Claims, 4 Drawing Sheets

SPEAKER DEVICE FOR PORTABLE TERMINAL

This application claims the benefit under 35 U.S.C. §119(a) of a application entitled "Speaker Device for Portable Terminal" filed in the Korean Intellectual Property Office on Oct. 6, 2005 and assigned Serial No. 2005-94012, the entire contents of which are incorporated herein by reference.

BACKGROUND OF THE INVENTION

1. Field of the Invention

The present invention generally relates to a portable terminal, and in particular, to a speaker device for a portable terminal, in which a better quality sound is produced by improving the sound pressure level, clearness, distortion and reinforcing a mid-bass of sound output.

2. Description of the Related Art

Generally, a "portable terminal" refers to an electronic apparatus, which provides electrical communication between users and service providers. Various applications such as voice communication, short message service, mobile banking service, TV watching, on-line game services, and on-demand video service are provided to via portable terminals.

Conventional portable terminals may be classified in various types according to their appearance. Portable communication terminals are classified as bar-type terminals, flip-type terminals, or folder-type terminals according to their appearance. In the bar-type terminal, input/output devices such as a communication circuit, a transmitting unit, and a receiving unit are mounted in a single housing. In a flip-type terminal, a flip cover is mounted on a bar-type terminal. In a folder-type terminal, a pair of housings are opened and closed through rotation and input/output devices are properly arranged over the pair of housings. Recently, a sliding-type terminal has been developed to improve portability user convenience, and satisfy various other user preferences.

As mobile communication services using portable terminals have been diversified, they not only provide voice communication and short message transmission but also transmission of games, music files, moving picture files, on-line games, multimedia services, and Digital Multimedia Broadcasting (DMB).

The display device of a portable terminal has already been equipped with a high-quality color screen using a Thin Film Transistor (TFT) device instead of a monochrome Liquid Crystal Display (LCD) device before commercialization of multimedia services and DMB. Using this display device, a portable terminal can provide sufficient performance to allow users to use multimedia services or watch DMB.

In order to provide a speaker device suitable for multimedia services and DMB services, separate speaker units are added to a single speaker unit that outputs a reception sound and a ring tone. Thus, the portable terminal can produce a stereo sound using the added speaker units.

However, the added speaker units cannot reach their full performance potential due to a limited space of the portable terminal. In other words, the sound pressure level, distortion, and clearness of the sound output are degraded. The sound in a bass region of the speaker units is inferior due to the limited space. As a result, users cannot enjoy a "live" sound when using multimedia services and DMB services.

SUMMARY OF THE INVENTION

It is, therefore, an object of the present invention to provide a speaker device for a portable terminal, which is mounted inside the portable terminal and is capable of producing a sound in a bass region.

It is another object of the present invention to provide a speaker device for a portable terminal, which can provide a "live" sound by producing a sound in a bass region during the use of multimedia services or watching of Digital Multimedia Broadcasting (DMB).

According to one aspect of the present invention, there is provided a speaker device for a portable terminal. The speaker device includes a speaker housing which provides a mounting space for accommodating a speaker unit and a resonating space connected to the mounting space and located around the mounting space.

According to another aspect of the present invention, there is provided a speaker device for a portable terminal. The speaker device includes a sub-housing and a cover. The sub-housing has an internal space that is divided by partitions formed in the inside of the sub-housing to provide a mounting space for accommodating a speaker unit and a resonating space connected to the mounting space and located around the mounting space and has an opened side. The cover is combined with a face of the sub-housing to close the mounting space and the resonating space. A portion of a sound output from the speaker unit travels rearward of the speaker unit, then changes its traveling direction into a side direction, and enters the resonating space.

BRIEF DESCRIPTION OF THE DRAWINGS

The above and other objects, features, and advantages of the present invention will be more apparent from the following description taken in conjunction with the accompanying drawings, in which.

DETAILED DESCRIPTION OF THE PREFERRED EMBODIMENT

The matters defined in the description below provides a detailed construction of the present invention, and elements are provided to assist in a comprehensive understanding of a preferred embodiment of the invention. Accordingly, those of ordinary skill in the art will recognize that various changes and modifications of the embodiments described herein can be made without departing from the scope and spirit of the invention. Also, descriptions of well-known functions and constructions are omitted in favor of clarity and conciseness.

Figure 1:
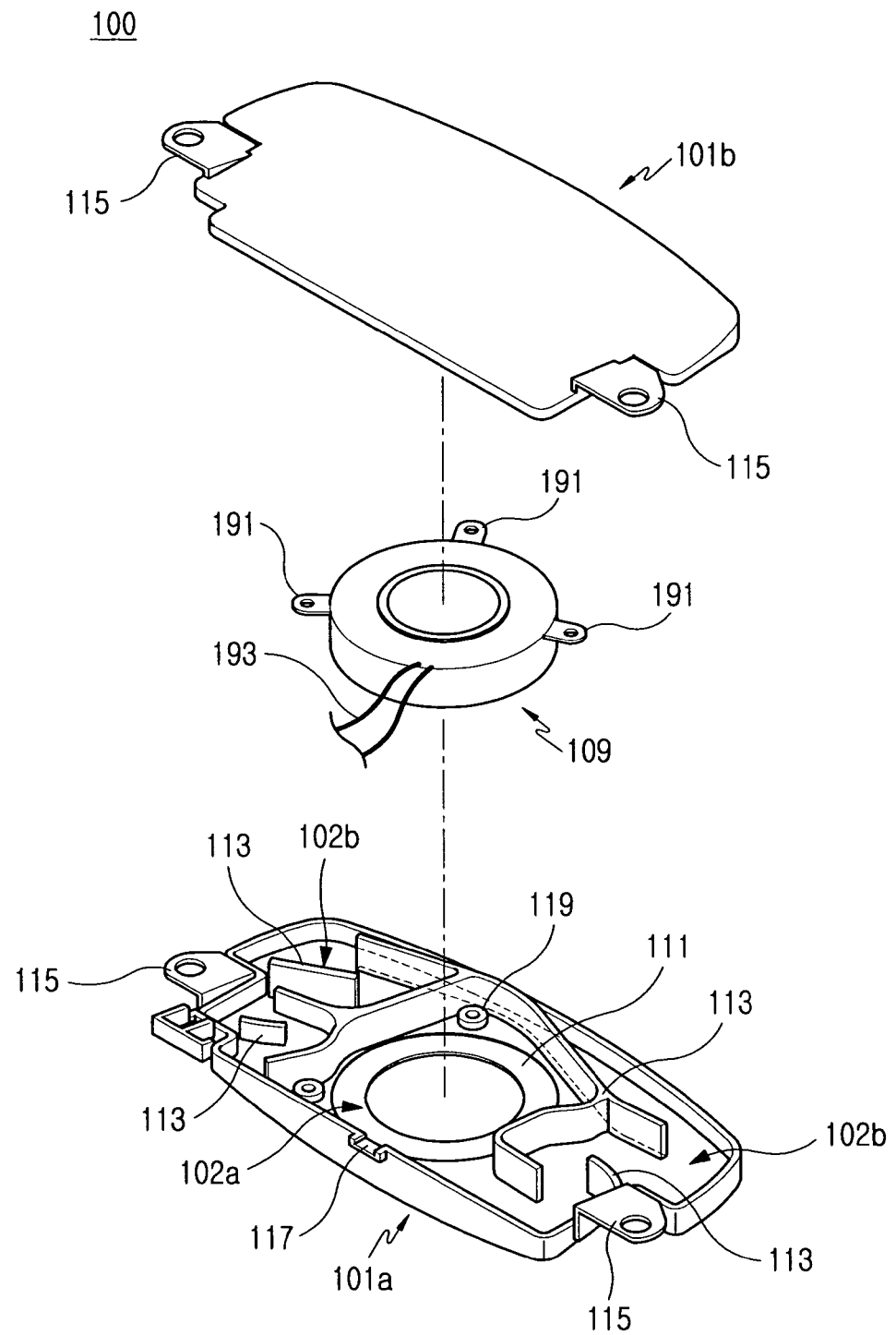
FIG. 1 is an exploded perspective view of a speaker device for a portable terminal according to the present invention.
Figure 2:
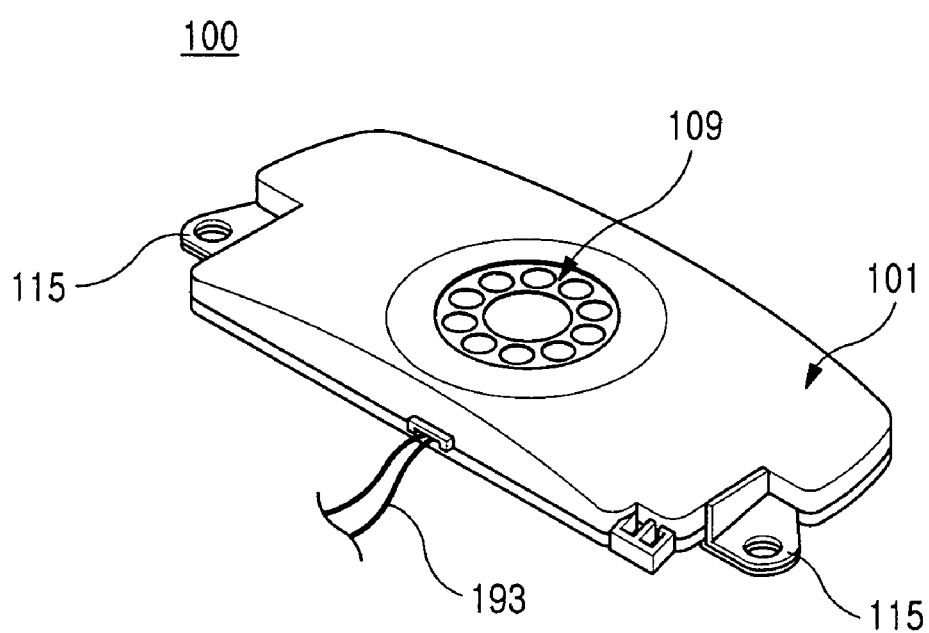
FIG. 2 is an assembled perspective view of the speaker device of FIG. 1.

As illustrated in FIGS. 1 and 2, a speaker device 100 according to the present invention includes a speaker housing 101 having a sub-housing 101a and a cover 101b. In the speaker housing 101, a mounting space 102a for mounting a speaker unit 109 and a resonating space 102b connected to the mounting space 102a are provided.

One face of the sub-housing 101a is opened and partitions 113 in various shapes are formed inside the sub-housing 101a. The partitions 113 divide an internal space of the sub-housing 101a into the mounting space 102a and the resonating space 102b. The mounting space 102a is located in the center of the sub-housing 101a and provides a space for mounting the speaker unit 109. Thus, the shape of the mounting space 102a preferably corresponds to that of the speaker unit 109.

An opening 111 is formed in the mounting space 102a to expose the mounting space 102a to the outside of the speaker housing 101. Once the speaker unit 109 is mounted in the mounting space 102a, it is exposed through the opening 111. A sound generated from the speaker unit 109 is output to the outside of the speaker housing 101 through the opening 111.

Engaging protrusions 119 are formed in the mounting space 102a to fix the speaker unit 109 and engaging parts 191 are formed in the speaker unit 109. If the speaker unit 109 is placed on the mounting space 102a, the top surfaces of the engaging protrusions 119 face the engaging parts 191. The engaging parts 191 are preferably fixed to the engaging protrusions 119 by screws, thereby fixing the speaker unit 109 onto the mounting space 102a. At this time, the speaker unit 109 faces the opening 111 and its edge is attached to the inside of the sub-housing 101a. A buffer material is interposed between the speaker unit 109 and the inside of the sub-housing 101a to prevent the sub-housing 101a from vibrating due to the operation of the speaker unit 109 and a sound generated from the operation of the speaker unit 109.

Conducting wires 193 are connected to the speaker unit 109 to receive an electric signal. The conducting wires 193 are brought out of the speaker housing 101 through a wiring groove 117 formed in the sub-housing 101a and are connected to a circuit board of a portable terminal.

The resonating space 102b is connected to the mounting space 102a and is located around the mounting space 102a. The resonating space 102b has curved patterns through the partitions 113 and the length of the resonating space 102b may vary according to the arrangement of the partitions 113.

Although the partitions 113 divide the internal space of the sub-housing 101a into the mounting space 102a and the resonating space 102b, the mounting space 102a and the resonating space 102b are connected to each other, and a space for mounting the speaker unit 109 is specified as the mounting space 102a and the remaining space is specified as the resonating space 102b.

The resonant frequency of a speaker device is in inverse proportion to the volume of the internal space of the speaker device and the length of a resonating space and is in proportion to the cross-sectional area of the resonating space. Since a speaker unit complies with a standard and the speaker device has a limited size to be mounted in a portable terminal, it is not best suited for the space available of the speaker device. Thus, to emphasize a sound in a bass region, having a low frequency band, it is necessary to reduce the cross-sectional area of the resonating space while increasing the length of the resonating space.

A space for mounting a speaker device in a portable terminal is limited, resulting in a limitation in the size of a speaker housing and the size of the internal space of the speaker housing. Thus, it is desirable to increase the length of the resonating space in the limited internal space of the speaker housing while reducing the cross-sectional area of the resonating space for the purpose of emphasizing the bass region of a sound output from the speaker device. Therefore, the resonating space 102b of the speaker device 100 has curved patterns around the mounting space 102a to maximize its length while minimizing its cross-sectional area.

The cover 101b is combined with the sub-housing 101a in opposition to the sub-housing 101a to close the sub-housing 101a and protect the speaker unit 109. Although not shown in the Figures, an elastic material is attached to the inside of the cover 101b to seal up a space between the top surfaces of the partitions 113 and the inside of the cover 101b. This is done because without such sealing, the curved patterns of the resonating space 102b are distorted and a designed resonating structure cannot be implemented. Rubber or poron may be used as the elastic material.

In addition, although not shown in the Figures, to seal up the space effectively between the sub-housing 101a and the cover 101b, combining ribs extending along the top surface of the circumference of the sub-housing 101a may be formed and grooves engaged with the combining ribs may be formed in the circumference of the cover 101a. By adding these sealing structures, the speaker device 100 can form a stable resonating structure.

The cover 101b is combined with the sub-housing 101a and thus, the sub-housing 101a is closed, thereby completing the resonating space 102b. The resonating space 102b shown in FIG. 1 has curved patterns at both sides of the resonating space 102b, in which the curved patterns are connected to each other along the circumference of the resonating space 102b. A portion of the sound output from the speaker unit 109 travels rearward of the speaker unit 109 toward the inside of the cover 101b, changes its traveling direction into the side direction of the cover 101b, and enters the resonating space 102b. The portion of the sound entering the resonating space 102b travels along the curved patterns of the resonating space 102b and reinforces a sound in a bass region generated from the speaker unit 109.

One of representative resonating structures of conventional speaker devices is a Helmholtz resonator. In the conventional speaker device including the Helmholtz resonator, the Helmholtz resonator extends in a straight line along a direction in which a sound is output from a speaker unit. This fact limits the reduction of the thickness of the speaker device and makes it impossible to mount the speaker device in a portable terminal.

The resonating structure of the speaker device 100 occupies a space having the same thickness as the speaker unit 109 and forms a three-dimensional sound traveling path, thereby reducing the thickness of the speaker device 100 and thus facilitating mounting of the speaker device 100 in a portable terminal.

When a speaker unit is mounted in a housing of a portable terminal, its resonant frequency increases up to 1-1.2 kHz and thus, a sound in a bass region cannot be produced satisfactorily. In the speaker device 100, the length of the resonating space 102b is set to 17 cm which is corresponding to half the wavelength of 1 kHz to reinforce a sound of a frequency less than 1 kHz. In other words, the resonant frequency of the speaker device 100 is set according to the length of the resonating space 102b.

Table 1 shows the performance of a speaker device mounted in conventional portable terminals and the performance of a speaker device according to the present invention. The conventional portable terminals include 8 models that have been manufactured and released into the market by the present assignee among terminals capable of playing multimedia files or providing DMB services and 7 models manufactured by 5 different manufacturers. Measured values below include the average of measured values for the 8 models (conventional-1) and the average of measured values for the 7 models (conventional-2).

TABLE 1

|  | Sound Pressure Level (SPLall) 630 Hz–8 kHz, Sones | Frequency Transient Response 1.25 kHz–5 kHz, dB | Clearness | Distortion (THD) 1.25 kHz–5 kHz, % |
| --- | --- | --- | --- | --- |
| Conventional-1 | 63.59 | 5.34 | 0.55 | 0.09 |
| Conventional-2 | 71.20 | 3.52 | 0.64 | 0.03 |
| Invention | 108.30 | 2.52 | 0.71 | 0.02 |

Here, clearness means the relative value of a sound output from the speaker device with respect to a reference sound of a wired telephone communication with the clearness figures of merit defined as 1. It is noted that in Table 1, the unit "sones" refers to a sound pressure level sensed by the ears in a sensitive range of sound.

As can be seen from Table 1, a sound output from the speaker device according to the present invention has improved sound pressure level, clearness, frequency transient response, and distortion, compared to those output from the conventional speaker devices.

Figure 3:
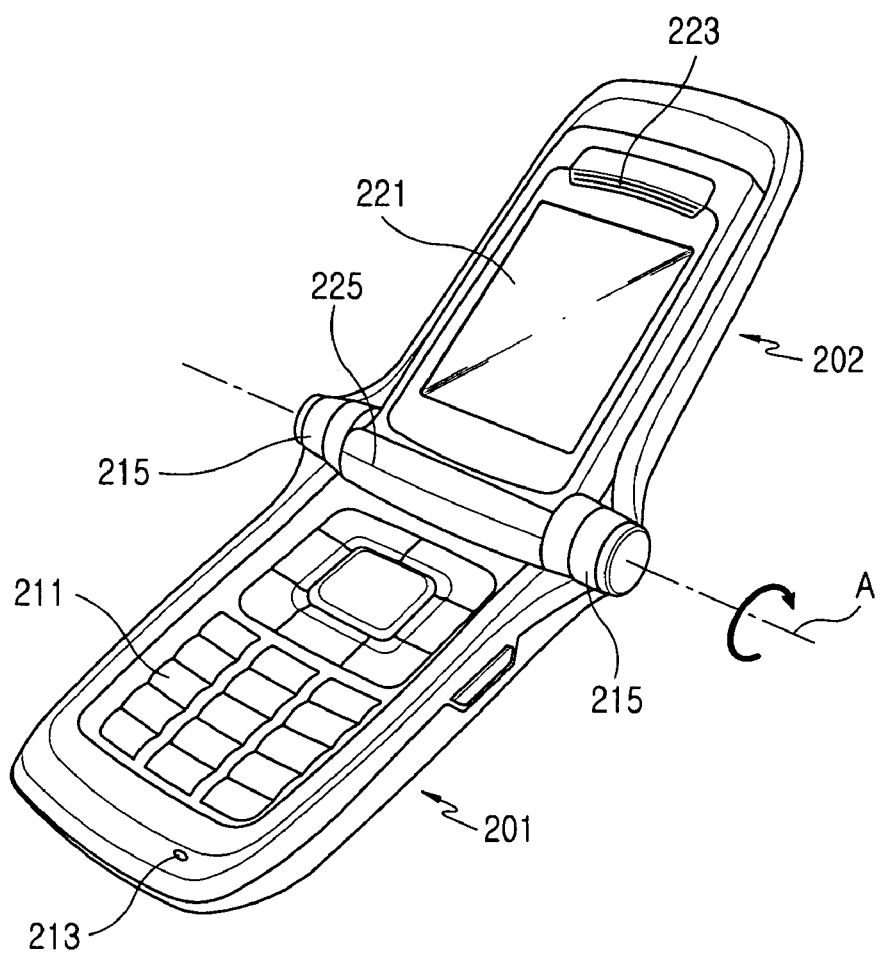
FIG. 3 is a perspective view of a portable terminal having the speaker device of FIG. 1.
Figure 4:
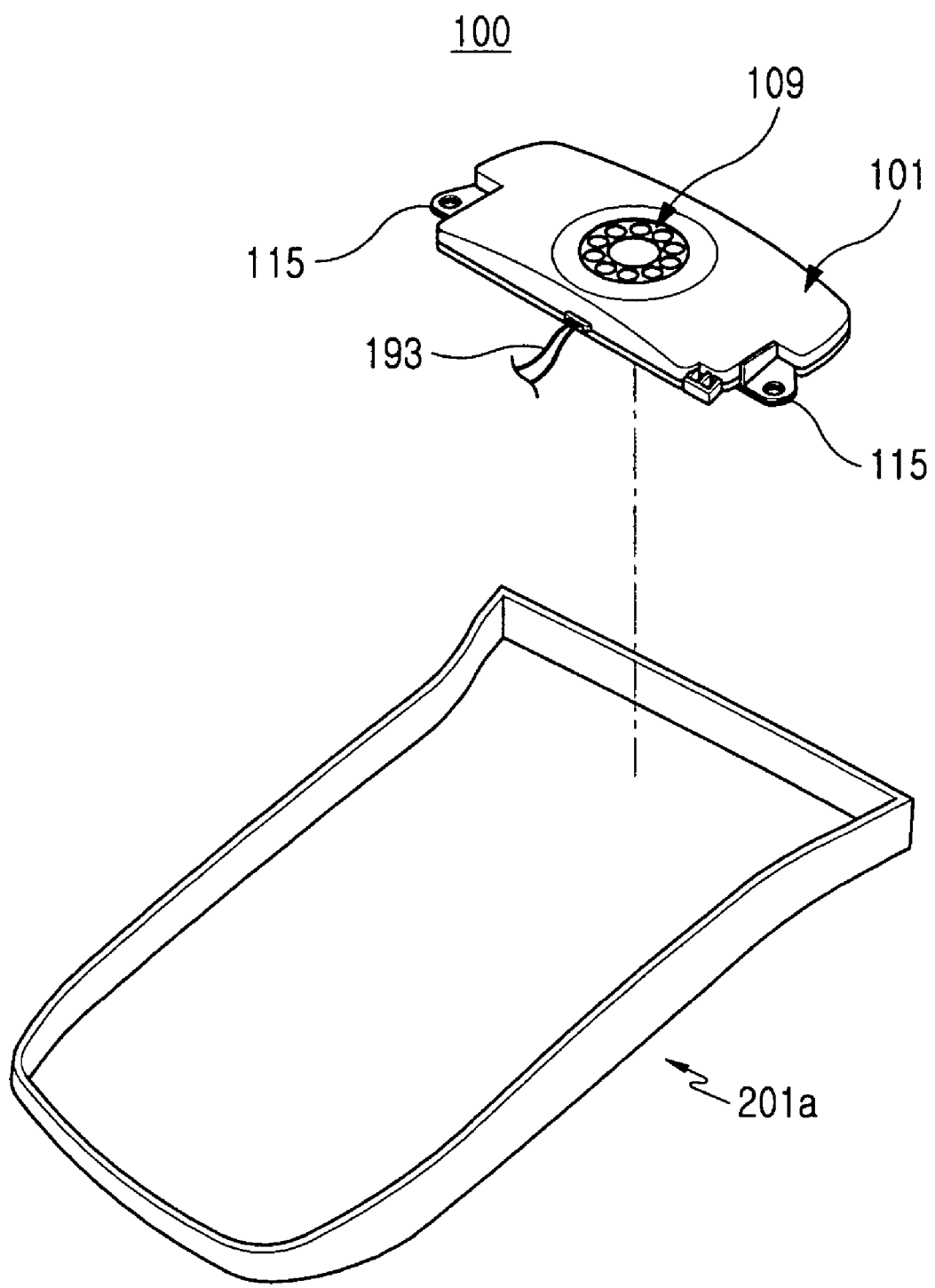
FIG. 4 is a perspective view showing the speaker device of FIG. 1 is combined with a housing of a portable terminal.

FIG. 3 is a perspective view of a portable terminal 200 including the speaker device 100 and FIG. 4 is a perspective view showing the speaker device 100 is mounted in a rear case 201a of the portable terminal 200.

The portable terminal 200 including the speaker device 100 is a folder-type terminal that can be folded through rotation of a first housing 201 and a second housing 202 with respect to each other. A keypad 211 and a transmitting unit 213 (or mouthpiece) are mounted in a surface of the first housing 201 and are opened or closed through rotation of the second housing 202. A display device 221 and a receiving unit 223 (or earpiece) are mounted in a face of the second housing 202 opposite to the first housing 201 and are opened or closed through rotation of the second housing 202 housing.

To rotatably combine the first housing 201 and the second housing 202, a pair of side hinge arms 215 are formed opposite to each other at both ends of an upper portion of the first housing 201 and a center hinge arm 225 is formed in a lower portion of the second housing 202. As the center hinge arm 225 is rotatably combined between the side hinge arms 215, the second housing 202 is rotatably combined with the first housing 201. A structure for combining a pair of housings of a folder-type terminal can be easily understood by those skilled in the art.

The speaker device 100 is mounted inside the first housing 201 of the portable terminal 200 and emphasizes a bass region in the portable terminal 200, thereby producing a "live" sound.

Referring to FIG. 4, the speaker device 100 is mounted inside the rear case 201a of the first housing 201. Structures of various shapes are formed for mounting of the speaker device 100, a circuit board, and a battery pack in the inside of the rear case 201a, but are not shown in FIG. 4 for simplicity.

The speaker device 100 is mounted such that its cover 101b faces the inside of the rear case 201a and a circuit board (not shown) is mounted in the rear case 201a after the speaker device 100 is mounted. The cover 101b may be implemented as a single body with the rear case 201a. An opening may be formed in the cover 101b to expose the speaker unit 109, and in this case, the sub-housing 101a may be mounted in the inside of the rear case 201a. Since the rear case 201a is generally manufactured by injection molding, the sub-housing 101a or the cover 101b can be directly molded in the inside of the rear case 201a.

According to the present invention, the sub-housing 101a and the cover 101b are manufactured separately from the rear case 201a and the speaker device 100 is assembled into a single module. To mount the speaker device 100 in the rear case 201a, engaging parts 115 may be formed in the speaker housing 101, more specifically, the sub-housing 101a and the cover 101b. The engaging parts 115 are formed for screw engagement, but may be fixed using an adhesive when both the rear case 201a and the speaker housing 101 are formed by injection molding.

As described above, according to the present invention, a speaker unit is mounted in a speaker housing having a resonating space, thereby solving the disadvantages of a small-size speaker unit, i.e., problems in producing a sound in a bass region. Moreover, by improving sound pressure level, distortion, and clearness, a "live" sound can be produced through a portable terminal during watching of multimedia files or DMB. Furthermore, the sound quality can be improved using the speaker housing, without addition of a separate speaker unit or addition or change of software or a circuit, thereby improving the performance of a speaker device of the portable terminal with low cost. In addition, since the resonating space of the speaker housing is formed such that the traveling direction of a sound follows a side direction instead of a direction in which a direction in which a sound is output from the speaker unit, the thickness of the speaker device is reduced and thus, it is easy to mount the speaker device in the portable terminal.

While the present invention has been shown and described with reference to a preferred embodiment thereof, it will be understood by those skilled in the art that various changes in form and details may be made therein without departing from the spirit and scope of the invention.

What is claimed is:

1. A speaker device for a portable terminal comprising:
   a speaker housing which provides a mounting space for accommodating a speaker unit and a resonating space connected to the mounting space and located around the mounting space; and
   partitions extending from the speaker housing into the resonating space;
   wherein the partitions divide an internal space of the speaker housing into the mounting space and the resonating space, and the resonating space has a curved pattern along the partitions.

2. The speaker device of claim 1, wherein the speaker housing comprises:
   a sub-housing having an opened side and the internal space that is divided by the partitions; and
   a cover combined with a face of the sub-housing to close the mounting space and the resonating space.

3. The speaker device of claim 2, further comprising an elastic material attached to the inside of the cover to seal up a space between the top surfaces of the partitions and the inside of the cover.

4. The speaker device of claim 3, wherein the elastic material is one of rubber and poron.

5. The speaker device of claim 1, wherein a resonant frequency is set by adjusting the length of the resonating space, which is measured from the point of the resonating space connected to the mounting space.

6. The speaker device of claim 1, wherein a portion of a sound output from the speaker unit travels rearward of the speaker unit, changes its traveling direction into a side direction, and enters the resonating space.

7. A speaker device for a portable terminal, comprising:
a sub-housing having an internal space that is divided by partitions formed in the inside of the sub-housing to provide a mounting space for accommodating a speaker unit and a resonating space connected to the mounting space and located around the mounting space and having an opened side, the partitions including a curved portion and a curved protrusion extending from the speaker housing into the resonating space, wherein the resonating space has a curved pattern along the partitions; and
a cover combined with a face of the sub-housing to close the mounting space and the resonating space,
wherein a portion of a sound output from the speaker unit travels rearward of the speaker unit, changes its traveling direction into a side direction, and enters the resonating space.

* * * * *